Jan. 29, 1952

N. G. TALBOTT 2,583,613

SAFETY BAR FOR WINDOW WASHERS

Filed Sept. 3, 1948

Inventor
N. G. TALBOTT

By

*J. M. Mantell*
ATTORNEYS

Patented Jan. 29, 1952

2,583,613

UNITED STATES PATENT OFFICE 2,583,613

SAFETY BAR FOR WINDOW WASHERS

Newton G. Talbott, Ogden, Utah

Application September 3, 1948, Serial No. 47,701

5 Claims. (Cl. 20—72)

(Granted under the act of March 3, 1883, as amended April 30, 1928; 370 O. G. 757)

This application is made under the act of March 3, 1883, as amended by the act of April 30, 1928, and the invention herein described, if patented in any country may be manufactured and used by or for the Government of the United States of America for governmental purposes throughout the world without the payment to me of any royalty thereon.

This invention relates to a safety-bar or guard primarily intended for use in washing windows.

An object of this invention is to provide a guard that can be used where no permanent window hooks or fasteners have been installed.

A particular object is a safety-bar that is readily put in place across the window-frame, inside the building.

Another object is to so design the bar that, should it accidentally come unfastened, it will slide down to the bottom of the window, at right angles to the vertical. It will not turn, and will still hold.

One embodiment of the invention is shown in the drawings, in which.

Figure 1:
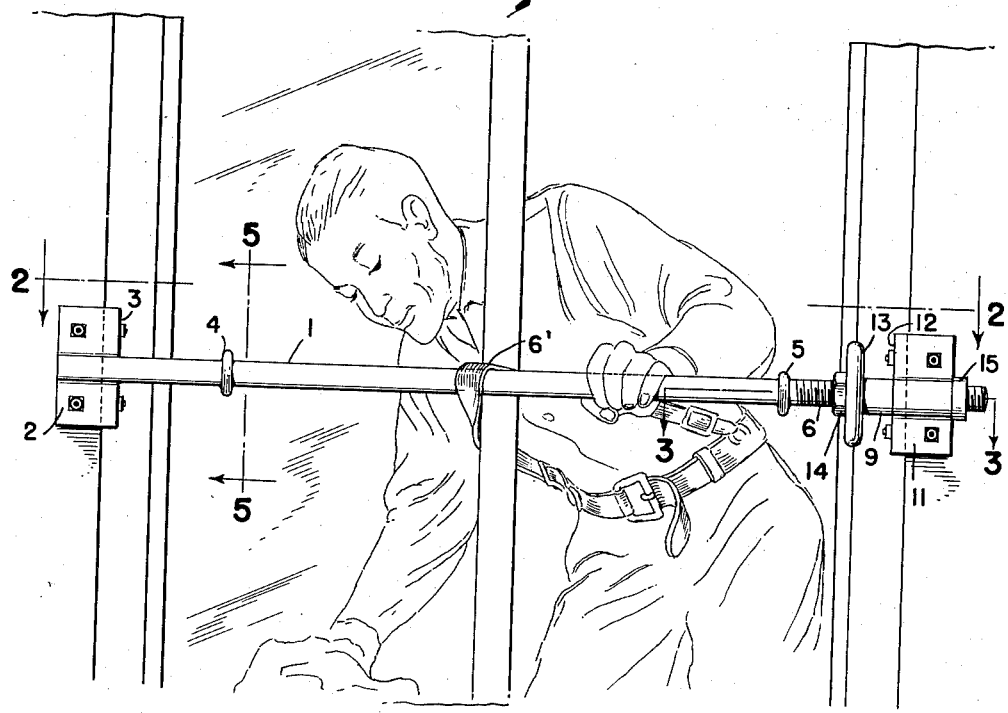
Figure 1 illustrates the safety-bar in place.
Figure 2:
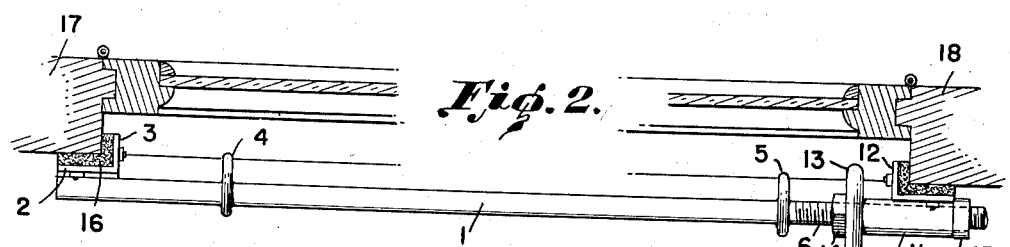
Figure 2 is a plan view of the bar in place, being a section on line 2—2 of Figure 1 but with the right and left sashes in closed position.
Figure 4:
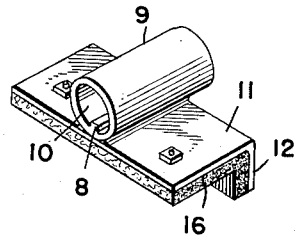
Figures 4 and 5 are detail views of parts hereinafter described.
Figure 3:
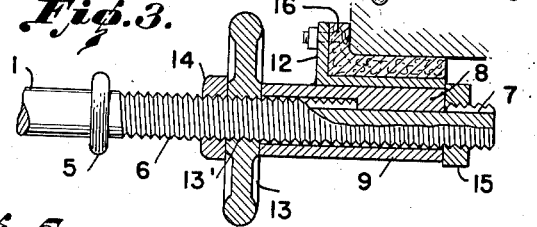
Figure 3 is a section on line 3—3 of Figure 1.
Figure 5:
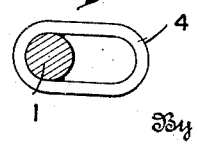

The device comprises a longitudinal bar 1, on the left end of which is rigidly affixed a plate 2 having a vertical flange 3. Also affixed to said bar are two hooks or rings 4 and 5 to which the safety belt 6' of the window washer is to be attached, as desired. The right end of the bar is screw-threaded at 6. A longitudinal slot 7 extends the full length of the screw-threaded area. This slot 7 serves as a key-way for key 8. Mounted upon the screw-threaded end of bar 1 is a cylindrical sleeve 9 having a smooth, unthreaded bore 10. Rigidly affixed to the sleeve 9 is a second plate 11 having a vertical flange 12. Hand wheel 13 has a screw threaded bore 13' which seats in the thread 6 of the bar. Locking nut 14 and threaded collar 15 hold the flange in place. Each flange is padded with a layer of felt 16 to minimize damage to the window frame.

In operation, the bar is placed across the window opening with the flanges in position against the window frame uprights 17 and 18, or against other vertical surfaces adjacent to the window. The wheel 13 is then turned to press longitudinally movable flange 12 tightly against the surface of 18. Locking collar 15 and nut 14 are then tightened.

Should the wheel accidentally be loosened, the bar will not turn. Both ends will fall downwardly together, the bar remaining at right angles to the window, because the key and slot arrangement prevents flange 12 from turning about the axis of the bar.

The vertical bar around which strap 6' is fastened is intended to represent the dividing bar between two sections of windows mounted in steel sash, and the window which the man is cleaning is an open window swung slightly outward.

Having thus described my invention I claim:

1. A safety device for a window comprising a bar, a flange rigidly affixed on the bar toward one end thereof, said flange having a surface extending transversely to the longitudinal axis of the bar, the other end of the bar being screw-threaded, a longitudinally extending key-way slot in the screw-threaded end, a sleeve mounted upon the screw-threaded end, a second flange rigidly affixed to the sleeve, said second flange having a surface extending transversely to the longitudinal axis of the sleeve and of the bar, the ends of the bar extending outwardly beyond said transverse surfaces, a key fixedly mounted by the sleeve and fitting in and longitudinally slidable in said slot, and operating means screw-threadedly mounted on said screw-threaded end of the bar to move said flange longitudinally outwardly the slot and key preventing the second flange from turning about the axis of the bar.

2. A safety device for a window comprising a bar, a window frame holding flange rigidly affixed on the bar toward one end thereof, said flange having a surface extending transversely to the longitudinal axis of the bar, a screw-thread toward the other end of the bar, a longitudinally extending key-way slot in said other end, longitudinally movable means mounted upon this end, a second window frame holding flange rigidly affixed to the longitudinally movable means, said second flange having a surface extending transversely to the longitudinal axis of the sleeve and of the bar, a key fixedly mounted by the longitudinally movable means and fitting in and longitudinally slidable in said slot, operating means screw-threadedly mounted on said screw-threaded end of the bar, adjacent to the movable means, to move said flange longitudinally outwardly, the slot and key preventing the second flange from turning about the axis of the bar.

3. A safety device for a window comprising a bar, a window frame holding flange rigidly affixed on the bar toward one end thereof, said flange having a surface extending transversely to the longitudinal axis of the bar, a screw-thread toward the other end of the bar, a longitudinally extending key-way slot in said other end, longitudinally movable means mounted upon this end, a second window frame holding flange rigidly affixed to the longitudinally movable means, said second flange having a surface extending transversely to the longitudinal axis of the sleeve and of the bar, a key fixedly mounted by the longitudinally movable means and fitting in and longitudinally slidable in said slot, operating means screw-threadedly mounted on said screw-threaded end of the bar, adjacent to the movable means, to move said flange longitudinally outwardly, the slot and key preventing the second flange from turning about the axis of the bar, both said flanges having longitudinally extending surfaces designed to abut the inner faces of the window frame.

4. The apparatus of claim 1, and locking means for fastening the operating means against rotation about the bar, and padding means mounted upon the transverse surfaces to minimize damage to the window frame.

5. A safety device for a window comprising a bar, a flange rigidly affixed on the bar toward one end thereof, said flange having a surface extending transversely to the longitudinal axis of the bar, the other end of the bar being screw-threaded, a longitudinally extending key-way slot in the screw-threaded end, a sleeve mounted upon the screw-threaded end, a second flange rigidly affixed to the sleeve, said second flange having a surface extending transversely to the longitudinal axis of the sleeve and of the bar, a key fixedly mounted by the sleeve and fitting in and longitudinally slidable in said slot, and operating means screw-threadedly mounted on said screw-threaded end of the bar to move said flange longitudinally outwardly, the slot and key preventing the second flange from turning about the axis of the bar, the operating means comprising a hand wheel which is mounted on the bar adjacent to the inner end of the sleeve, a locking nut screw-threadedly mounted upon the bar to fasten the hand wheel in place, and padding means mounted upon the transverse surfaces to minimize damage to the window frame.

NEWTON G. TALBOTT.

REFERENCES CITED

The following references are of record in the file of this patent:

UNITED STATES PATENTS

| Number | Name | Date |
| --- | --- | --- |
| 891,897 | Astrom | June 30, 1908 |
| 1,891,588 | Claus | Dec. 20, 1932 |
| 2,277,608 | Rosenblatt | Mar. 24, 1942 |

FOREIGN PATENTS

| Number | Country | Date |
| --- | --- | --- |
| 17,456 | Germany | 1882 |